(12) United States Patent
Zhang (10) Patent No.: US 11,945,386 B2
(45) Date of Patent: Apr. 2, 2024

(54) PNEUMATIC IDENTIFICATION APPARATUS FOR WEIGHT OF SEAT OCCUPANT, AND PNEUMATIC IDENTIFICATION SEAT

(71) Applicant: LANGFANG GOLDEN TIME TECHNOLOGY DEVELOPMENT CO., LTD., Hebei (CN)

(72) Inventor: Haitao Zhang, Hebei (CN)

(73) Assignee: LANGFANG GOLDEN TIME TECHNOLOGY DEVELOPMENT CO., LTD., Hebei (CN)

( * ) Notice: Subject to any disclaimer, the term of this patent is extended or adjusted under 35 U.S.C. 154(b) by 35 days.

(21) Appl. No.: 17/800,629

(22) PCT Filed: Jul. 20, 2021

(86) PCT No.: PCT/CN2021/107268
§ 371 (c)(1),
(2) Date: Aug. 18, 2022

(87) PCT Pub. No.: WO2022/022325
PCT Pub. Date: Feb. 3, 2022

(65) Prior Publication Data
US 2023/0081371 A1 Mar. 16, 2023

(30) Foreign Application Priority Data
Jul. 29, 2020 (CN) .......................... 202010746147.0

(51) Int. Cl.
*B60R 21/015* (2006.01)
*B60N 2/00* (2006.01)

(52) U.S. Cl.
CPC ........ *B60R 21/01516* (2014.10); *B60N 2/002* (2013.01); *B60R 21/015* (2013.01); *B60R 21/01528* (2014.10)

(58) Field of Classification Search
CPC ... B60R 21/00; B60R 21/013; B60R 21/0132; B60R 21/0134; B60R 21/0015;
(Continued)

(56) References Cited

U.S. PATENT DOCUMENTS 5,918,696 A    7/1999   VanVoorhies
6,043,736 A *   3/2000   Sawahata ............... B60N 2/002
                                                       340/438
(Continued)

FOREIGN PATENT DOCUMENTS

CN      1619341 A     5/2005
CN    106183914 A    12/2016
(Continued)

OTHER PUBLICATIONS

NPL Search (Nov. 15, 2023).*
(Continued)

*Primary Examiner* — Van T Trieu
(74) *Attorney, Agent, or Firm* — Ziegler IP Law Group (57) ABSTRACT

A pneumatic identification apparatus for the body weight of a seat occupant includes a control unit and at least one sensing apparatus each including a pneumatic sensing apparatus and an auxiliary sensing apparatus; the pneumatic sensing apparatus includes at least one soft elastic hollow structure body and a sensing unit; the soft elastic hollow structure body communicates with a first air pressure sensor, the first air pressure sensor being configured to measure a first air pressure value $P_a$ in the soft elastic hollow structure body; the control unit is configured to compare the first air pressure value $P_a$ with standard set values and correspondingly output a body weight type; and the auxiliary sensing apparatus includes a top pressure-bearing plate and a bottom carrying plate respectively mounted on two end faces of the soft elastic hollow structure body. Further provided is a (Continued)

pneumatic identification seat provided with the pneumatic identification apparatus.

20 Claims, 6 Drawing Sheets

(58) Field of Classification Search
CPC ........ B60R 21/01516; B60R 21/01522; B60R 21/01524; B60R 22/48; B60N 2/00; B60N 2/002; G08B 21/22; G08B 21/24
See application file for complete search history.

(56) References Cited

U.S. PATENT DOCUMENTS

| | | | | |
|---|---|---|---|---|
| 6,056,079 | A | * | 5/2000 | Cech ...................... B60N 2/002 177/144 |
| 6,058,341 | A | * | 5/2000 | Myers ................ G01G 19/4142 177/144 |
| 6,674,024 | B2 | * | 1/2004 | Cech ...................... B60N 2/002 177/144 |
| 2004/0061615 | A1 | * | 4/2004 | Takashima ............. G08B 21/06 340/575 |
| 2005/0067828 | A1 | * | 3/2005 | Norton .................... G01L 5/103 280/806 |
| 2015/0137569 | A1 | | 5/2015 | Goedert |

FOREIGN PATENT DOCUMENTS

| | | |
|---|---|---|
| CN | 106248294 A | 12/2016 |
| CN | 111907458 A | 11/2020 |
| EP | 1533193 A1 | 5/2005 |
| EP | 3369610 A1 | 9/2018 |

OTHER PUBLICATIONS

International Search Report, China National Intellectual Property Administration, Application No. PCT/CN2021/107268, dated Sep. 27, 2021, 5 pages, English Translation Attached, 3 pages.

Written Opinion of the International Searching Authority, China National Intellectual Property Administration, Application No. PCT/CN2021/107268, dated Sep. 20, 2021, 4 pages.

* cited by examiner

PNEUMATIC IDENTIFICATION APPARATUS FOR WEIGHT OF SEAT OCCUPANT, AND PNEUMATIC IDENTIFICATION SEAT

CROSS-REFERENCE TO RELATED APPLICATION

The present disclosure claims priority of Chinese patent application with the filing number 2020107461470 filed on Jul. 29, 2020 with the Chinese Patent Office, and entitled "PNEUMATIC IDENTIFICATION APPARATUS FOR WEIGHT OF SEAT OCCUPANT, AND PNEUMATIC IDENTIFICATION SEAT", the contents of which are incorporated herein by reference in entirety.

TECHNICAL FIELD

The present disclosure relates to the technical field of pneumatic identification, in particular to a pneumatic identification apparatus for weight (human body weight) of seat occupant and a pneumatic identification seat.

BACKGROUND ART

In recent years, with the increasing awareness of ride safety, more and more safety systems have been continuously developed. For example, a sensor is installed on the seat to detect whether the seat is occupied, which can be used to enable or disable the safety airbag, and a voice-operated device can also be installed to prompt the seat belt to be fastened when the seat is in an occupied state, so that the travel safety is further improved.

However, most of the existing technologies can only detect whether the seat is occupied, to enable or disable the safety airbag, and because they cannot accurately detect the human body type of the occupant, it cannot accurately control whether the safety airbag is enabled, therefore, in many testing processes, the safety airbag cannot be ejected or enabled satisfactorily in an effective direction or in an effective range according to different human body types of the occupants.

Therefore, the present disclosure can effectively detect the human body type of the occupant through the identification system for the human body type of the occupant, the self-identification seat, and the cooperation of the pneumatic sensing apparatus and the auxiliary sensing apparatus, so as to provide assistance for the improvement of safety performance and the vehicle safety system, more precisely control whether the safety airbag can be enabled in the event of an accident, and provide a reliable foundation for the development of vehicle safety.

SUMMARY

The present disclosure provides a pneumatic identification apparatus for human body weight of a seat occupant and a pneumatic identification seat, which may effectively detect the human body type of an occupant.

The present disclosure provides a pneumatic identification apparatus for the human body weight of the seat occupant, which may comprise a control unit and at least one sensing apparatus, wherein the at least one sensing apparatus each may comprise a pneumatic sensing apparatus and an auxiliary sensing apparatus;

the pneumatic sensing apparatus may comprise: at least one soft elastic hollow structure body with an intermediate air space structure and a sensing unit, wherein the sensing unit may comprise a first air pressure sensor; and the soft elastic hollow structure body may communicate with the first air pressure sensor, wherein the first air pressure sensor is configured to detect a first air pressure value $P_a$ in the soft elastic hollow structure body;

the auxiliary sensing apparatus may comprise: a top pressure-bearing plate and a bottom carrying plate, wherein the top pressure-bearing plate may be provided on the upper end surface of the soft elastic hollow structure body, the bottom carrying plate may be provided at the lower end surface of the soft elastic hollow structure body; and the input end of the control unit 1 may be connected to the output end of the first air pressure sensor, and the output end of the control unit may be connected to the external communication; the control unit is configured to acquire the first air pressure value $P_a$, compare the first air pressure value $P_a$ with standard set values for determination and correspondingly output a human body weight type to the external communication.

Through the mutual cooperation of the above-mentioned structures, the human body type of the occupant may be effectively detected, which can provide assistance for the improvement of safety performance and the vehicle safety system, and provide a reliable foundation for the development of vehicle safety.

According to the technical solutions provided by the embodiments of the present disclosure, the standard set values may include a first threshold value $P_1$, a second threshold value $P_2$, a third threshold value $P_3$, a fourth threshold value $P_4$, and a fifth threshold value $P_5$;

when the first air pressure value $P_a$ is less than or equal to the first threshold value $P_1$, the control unit outputs information of seat being unoccupied;

when the first air pressure value $P_a$ is greater than the first threshold value $P_1$ and less than the second threshold value $P_2$, the control unit outputs information of seat being occupied;

when the first air pressure value $P_a$ is greater than the second threshold value $P_2$ and less than the third threshold value $P_3$, the control unit outputs information of small-weight occupant;

when the first air pressure value $P_a$ is greater than the third threshold value $P_3$ and less than the fourth threshold value $P_4$, the control unit outputs information of medium-weight occupant;

when the first air pressure value $P_a$ is greater than the fourth threshold value $P_4$ and less than the fifth threshold value $P_5$, the control unit outputs information of large-weight occupant; and when the first air pressure value $P_a$ is greater than or equal to the fifth threshold value $P_5$, the control unit outputs information of heavy-weight occupant.

Optionally, when the first air pressure value $P_a$ is equal to the second threshold value $P_2$, the control unit (1) outputs information of seat being occupied;

when the first air pressure value $P_a$ is equal to the third threshold value $P_3$, the control unit (1) outputs information of small-weight occupant; and when the first air pressure value $P_a$ is equal to the fourth threshold value $P_4$, the control unit (1) outputs information of medium-weight occupant.

Optionally, the first threshold value $P_1$ may be set to 0.02 Mpa, the second threshold value $P_2$ may be set to 0.025 Mpa, the third threshold value $P_3$ may be set to 0.03 Mpa, the fourth threshold value $P_4$ may be set to 0.035 Mpa, and the fifth threshold value $P_5$ may be set to 0.04 Mpa, wherein the set values of the first threshold value $P_1$, the second threshold value $P_2$, the third threshold value $P_3$, the fourth threshold value $P_4$ and the fifth threshold value $P_5$ are relative values relative to a standard atmospheric pressure.

According to the technical solutions provided by the embodiments of the present disclosure, the sensing unit may further comprise a second air pressure sensor, and the second air pressure sensor is configured to detect the second air pressure value $P_b$ in the outside world; the output end of the second air pressure sensor may be connected to the input end of the control unit, and the control unit is further configured to: calculate $P_c = P_0 - P_b$, $P_0$ is standard atmospheric pressure; and reduce all of the standard set values by $P_c$.

The above-mentioned technical solutions make the data detected in different environments more accurate.

According to the technical solutions provided by the embodiments of the present disclosure, the auxiliary sensing apparatus may further comprise at least one pressure-bearing vertical plate, one end of the pressure-bearing vertical plate may be installed with a restriction assembly body, and the restriction assembly body abuts against the bottom of the bottom carrying plate, and the other end of the pressure-bearing vertical plate may be fixedly connected to the bottom of the top pressure-bearing plate.

Optionally, a plurality of the pressure-bearing vertical plates are provided.

Optionally, the bottom carrying plate may be provided with at least one first through hole running therethrough, and the at least one pressure-bearing vertical plate may pass through the at least one first through hole so that the restriction assembly body abuts against the bottom of the bottom carrying plate.

According to the technical solutions provided by the embodiments of the present disclosure, the pneumatic sensing apparatus may further comprise at least one one-way check valve, the air outlet of the one-way check valve may communicate with the soft elastic hollow structure body, and the air inlet of the one-way check valve may communicate with the external atmosphere of the soft elastic hollow structure body.

Optionally, a valve core and an elastic body are provided in the one-way check valve.

According to the technical solutions provided by the embodiments of the present disclosure, a soft rebound filling body may be installed in the soft elastic hollow structure body.

Optionally, the soft rebound filling body may be at least one of a foamed sponge, a three-dimensional spacer fabric, a corrugated rubber-plastic spacer, and a soft elastic nonwoven cushion.

According to the technical solutions provided by the embodiments of the present disclosure, there are several sensing apparatuses, and the several sensing apparatuses share the one control unit, and the air circuits between sensing apparatuses are not communicated.

According to the technical solutions provided by the embodiments of the present disclosure, the pneumatic sensing apparatus further may comprise a circuit connector, the circuit connector may be provided at the bottom of the bottom carrying plate, and the interior of circuit connector may be connected with the control unit and the sensing unit, the bottom of the bottom carrying plate is provided with a second through hole running therethrough, so that the first air pipe communicates the first air pressure sensor with the soft elastic hollow structure body through the second through hole.

Optionally, an auxiliary bearing layer may be provided between the top of the bottom carrying plate and the soft elastic hollow structure body, and the auxiliary bearing layer may be provided to protect and buffer the soft elastic hollow structure body to prevent the pneumatic sensing apparatus from being damaged due to excessively large force applied on the soft elastic hollow structure body.

Optionally, the auxiliary bearing layer may be at least one of a hard board, a sticky mat, and a spongy layer.

Optionally, the soft elastic hollow structure body may be further communicated with a human body detection sensor switch, and the human body detection sensor switch may be any one of a membrane type pressure electronic switch, a capacitive type human body detection sensor, a mechanical type electric shock pressure sensor, and an image sensor, and simultaneously, the human body detection sensor switch may be connected to the control unit to cooperate with each other to detect human body type information.

Optionally, the soft elastic hollow structure body may be further communicated with an overflow valve.

The present disclosure provides a pneumatic identification seat, which may comprise a seat surface and/or a backrest, wherein a spring bracket and a spongy cushion are installed on the seat surface and/or the backrest; and further comprise the pneumatic identification apparatus according to above-mentioned structure, wherein a groove is provided at the bottom of the spongy cushion, and the pneumatic identification apparatus is installed in the groove.

According to the technical solutions provided by the embodiments of the present disclosure, a positioning apparatus configured to be fixedly connected to the spring bracket may be installed at the bottom of the bottom carrying plate, and the positioning apparatus may be fixedly connected to the spring bracket.

Optionally, a positioning hook can be selected as the positioning apparatus.

The advantages of the present disclosure comprise, for example, that the soft elastic hollow structure body is installed between the top pressure-bearing plate and the bottom carrying plate and the soft elastic hollow structure body is communicated with the first air pressure sensor and the control unit through the air pipe, therefore, when the top pressure-bearing plate is subjected to downward pressure, the top pressure-bearing plate compresses the soft elastic hollow structure body, and the air pressure value $P_a$ inside the soft elastic hollow structure body is measured by the first air pressure sensor and compared with the standard set values for determination, and then the human body weight type is correspondingly output to the external communication;

it can be known that the heavier the weight of the occupant is, the larger the first air pressure value $P_a$ in the soft elastic hollow structure body is; and the lighter the weight of the occupant is, the smaller the first air pressure value $P_a$ in the soft elastic hollow structure body is;

therefore, the standard values can be set as several air pressure value intervals, the first pressure value $P_a$ can be compared with the several air pressure value intervals for determination, and the corresponding human body type information can be output, for example, seat being unoccupied, seat being occupied, small-weight occupant, medium-weight occupant, heavy-weight occupant and the like.

Through the mutual cooperation of the above-mentioned structures, the human body type of the occupant can be effectively detected, which can provide assistance for the improvement of safety performance and the vehicle safety system, and provide a reliable foundation for the development of vehicle safety.

BRIEF DESCRIPTION OF DRAWINGS

Other features, objects and advantages of the present disclosure will become more apparent by reading the detailed description of the non-limiting embodiments made with reference to the following drawings.

REFERENCE SIGNS IN DRAWINGS 1. control unit; 2. external communication; 3. soft elastic hollow structure body; 4. one-way check valve; 5. first air pressure sensor; 6. first air pipe; 7. second air pressure sensor; 8. soft rebound filling body; 9. air source; 10. circuit connector; 11. connector terminal; 12. second air pipe; 13. spongy cushion; 14. spring bracket; 15. top pressure-bearing plate; 16. bottom carrying plate; 17. groove; 18. pressure-bearing vertical plate; 19. first through hole; 20. second through hole; 21. positioning hook; 22. restriction assembly body; 23. positioning mounting hole; 24. carrying fender; 25. positioning dowel; 26. steel lacing wire; 27. auxiliary bearing layer; 28. circuit board; 29. housing; 30. cavity; 31. piston; 32. piston rod; 33. elastic body.

DETAILED DESCRIPTION OF EMBODIMENTS

The present disclosure will be further described in detail below with reference to the accompanying drawings and embodiments. It should be understood that the embodiments described herein are only used to explain the present disclosure, but not to limit the present disclosure. In addition, it should be also noted that, for the convenience of description, only the parts related to the present disclosure are shown in the drawings.

It should be noted that similar reference numerals and letters indicate similar items in the following accompanying drawings, therefore, once a certain item is defined in one drawing, it does not need to be further defined and explained in the subsequent drawings.

In the description of the present disclosure, it should be noted that orientation or positional relations indicated by terms such as "center", "upper", "lower", "left", "right", "vertical", "horizontal", "inner", and "outer" are based on orientation or positional relations as shown in the accompanying drawings, or are the orientation or positional relationships that the product of the invention is usually placed in use, merely for facilitating the description of the present disclosure and simplifying the description, rather than indicating or implying that related devices or elements have to be in the specific orientation, or configured or operated in a specific orientation, therefore, they should not be construed as limitations on the present disclosure.

Besides, terms "first", "second" and "third", if appear, are merely for distinguishing the description, but should not be construed as indicating or implying importance in relative.

In the description of the present disclosure, it should be noted that, unless otherwise definitely specified and limited, the terms "provide", "mount", "link" and "connect" should be understood in a broad sense, for example, they can be fixed connection, detachable connection or integrated connection; they can be mechanical connection or electrical connection; they can be direct connection or indirect connection by intermediate medium, or can be the internal communication between two components. For those ordinarily skilled in the art, the specific meaning of the above terms in the present disclosure can be understood according to the specific situation.

It should be noted that the embodiments in the present disclosure and the features of the embodiments may be combined with each other in the case of no conflict. The present disclosure will be described in detail below with reference to the accompanying drawings and in conjunction with the embodiments.

Figure 1:
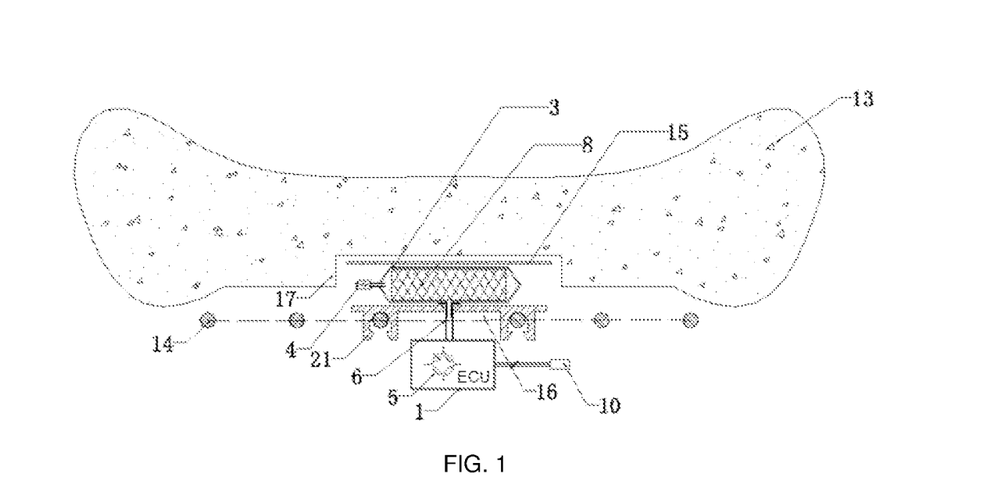
FIG. 1 is a pneumatic identification apparatus for human body weight of seat occupant provided by the present disclosure.

Please refer to FIG. 1 for a structural schematic view of a pneumatic identification apparatus for the human body weight of a seat occupant provided by the present disclosure, which may include a control unit 1 and a sensing apparatus, wherein the sensing apparatus includes a pneumatic sensing apparatus and an auxiliary sensing apparatus;

the pneumatic sensing apparatus may comprise at least one soft elastic hollow structure body 3 with an intermediate air space structure and a sensing unit, wherein the sensing unit may comprise a first air pressure sensor 5; the soft elastic hollow structure body 3 may communicate with the first air pressure sensor 5, wherein the first air pressure sensor 5 is configured to detect a first air pressure value $P_a$ in the soft elastic hollow structure body 3; specifically, the soft elastic hollow structure body 3 may communicate with the first air pressure sensor 5 through the first air pipe 6.

the auxiliary sensing apparatus may comprise a top pressure-bearing plate 15 and a bottom carrying plate 16, wherein the top pressure-bearing plate 15 may be provided on the upper end surface of the soft elastic hollow structure body 3, the bottom carrying plate 16 may be provided at the lower end surface of the soft elastic hollow structure body 3; and the input end of the control unit 1 may be connected to the output end of the first air pressure sensor 5, and the output end of the control unit 1 is connected to the external communication 2; the control unit 1 is configured to acquire the first air pressure value Pa, compare the first air pressure value $P_a$ with standard set values for determination and correspondingly output a human body weight type to the external communication 2.

Specifically, the material of the top pressure-bearing plate 15 may be rigid (plastic or metal), flexible, or a relatively dense felt material made of foam.

Specifically, the standard values can be set as several air pressure value intervals, and these several air pressure value intervals correspond to the human body type information of different weight intervals respectively, and the first air pressure value $P_a$ is compared with these several air pressure value intervals, and corresponding human body type information is output, for example, seat being unoccupied, small-weight occupant, medium-weight occupant, heavy-weight occupant and the like.

Figure 8:
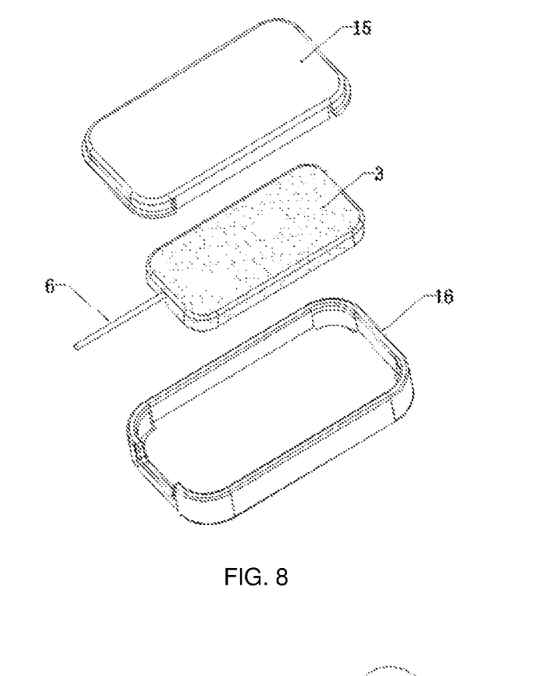
FIG. 8 is an installation exploded view of the top pressure-bearing plate, the bottom carrying plate and the soft elastic hollow structure body.

Specifically, the soft elastic hollow structure body 3 may be installed between the top pressure-bearing plate 15 and the bottom carrying plate 16 by means of standard parts assembly, or as shown in FIG. 8, the soft elastic hollow structure body 3 is snapped between the top pressure-bearing plate 15 and the bottom carrying plate 16.

Specifically, the soft elastic hollow structure body 3 may further be communicated with a human body detection sensor switch, and the human body detection sensor switch may be any one of a membrane type pressure electronic switch, a capacitive type human body detection sensor, a mechanical type electric shock pressure sensor, and an image sensor, and simultaneously, the human body detection sensor switch is connected to the control unit 1 to cooperate with each other to detect human body type information.

Specifically, the soft elastic hollow structure body 3 may also be communicated with an overflow valve, the overflow valve may be installed in the soft elastic hollow structure body 3 or the channel communicated with the soft elastic hollow structure body 3; when in use, the safe value can be set according to the actual environment, when the pressure value in the soft elastic hollow structure body 3 exceeds the safe value, the safety valve in the overflow valve is opened, and part of the air is discharged to the external environment, so that the system pressure does not exceed the safe value, thereby preventing occurrence of accident of the apparatus due to excessively high pressure.

Working principle: when the top pressure-bearing plate 15 is subjected to downward pressure, the top pressure-bearing plate 15 compresses the soft elastic hollow structure body 3, and under the action of carrying and supporting of the bottom carrying plate 16, the internal air pressure value of the soft elastic hollow structure body 3 changes, the air pressure value inside the soft elastic hollow structure body 3 is measured as the first air pressure value $P_a$ by the first air pressure sensor 5 and output to the control unit, the control unit compares the first air pressure value $P_a$ with the standard set values for determination, and then the human body weight type is correspondingly output to the external communication 2;

It can be known that the heavier the weight of the occupant is, the larger the first air pressure value $P_a$ in the soft elastic hollow structure body 3 is; and the lighter the weight of the occupant is, the smaller the first air pressure value $P_a$ in the soft elastic hollow structure body is;

therefore, the standard values are set as several air pressure value intervals, the first pressure value $P_a$ is compared with these several air pressure value intervals for determination, and the corresponding human body type information is output, for example, seat being unoccupied, seat being occupied, small-weight occupant, medium-weight occupant, heavy-weight occupant and the like.

Through the mutual cooperation of the above-mentioned structures, the human body type of the occupant can be effectively detected, which can provide assistance for the improvement of safety performance and the vehicle safety system, and provide a reliable foundation for the development of vehicle safety.

In the above, in a preferred embodiment of the control unit 1, the standard set values include a first threshold value $P_1$, a second threshold value $P_2$, a third threshold value $P_3$, a fourth threshold value $P_4$ and a fifth threshold value $P_5$;

when the first air pressure value $P_a$ is less than or equal to the first threshold value $P_1$, the control unit 1 outputs information of seat being unoccupied;

when the first air pressure value $P_a$ is greater than the first threshold value $P_1$ and less than the second threshold value $P_2$, the control unit 1 outputs information of seat being occupied;

when the first air pressure value $P_a$ is greater than the second threshold value $P_2$ and less than the third threshold value $P_3$, the control unit 1 outputs information of small-weight occupant;

when the first air pressure value $P_a$ is greater than the third threshold value $P_3$ and less than the fourth threshold value $P_4$, the control unit 1 outputs information of medium-weight occupant;

when the first air pressure value $P_a$ is greater than the fourth threshold value $P_4$ and less than the fifth threshold value $P_5$, the control unit 1 outputs information of large-weight occupant; and when the first air pressure value $P_a$ is greater than or equal to the fifth threshold value $P_5$, the control unit 1 outputs information of heavy-weight occupant.

Optionally, when the first air pressure value $P_a$ is equal to the second threshold value $P_2$, the control unit 1 outputs information of seat being occupied;

when the first air pressure value $P_a$ is equal to the third threshold value $P_3$, the control unit 1 outputs information of small-weight occupant;

when the first air pressure value $P_a$ is equal to the fourth threshold value $P_4$, the control unit 1 outputs information of medium-weight occupant.

In order to further illustrate the working principle of this embodiment, preferably, the first threshold value $P_1$ may be set to 0.02 Mpa, the second threshold value $P_2$ may be set to 0.025 Mpa, the third threshold value $P_3$ may be set to 0.03 Mpa, the fourth threshold value $P_4$ may be set to 0.035 Mpa, and the fifth threshold value $P_5$ may be set to 0.04 Mpa, wherein the set values of the first threshold value $P_1$, the second threshold value $P_2$, the third threshold value $P_3$, the fourth threshold value $P_4$ and the fifth threshold value $P_5$ are relative values relative to a standard atmospheric pressure, i.e., 0.1 Mpa;

When the first air pressure sensor 5 detects the first air pressure value $P_a$ in the soft elastic hollow structure body 3, for example, detects that the air pressure value $P_a$ is 0.041 Mpa, the first air pressure sensor 5 outputs the air pressure value $P_a$ to the control unit 1, the control unit 1 compares the air pressure value $P_a$ with the standard value for determination, that is, 0.041 Mpa is greater than the fifth threshold value P5, and then the control unit 1 outputs the information of heavy-weight occupant to the external communication 2.

In the above, when there are more than one sensing apparatuses, the sensing apparatuses are placed in different areas of the seat respectively, such as the main seat area and the flank support areas on both sides, and the first air pressure sensor 5 of each sensing apparatus may detect the $P_a$ value of the sensing apparatus, the control unit 1 can not only determine the above-mentioned human body type information, but can also determine which specific areas are occupied according to the pressure values $P_a$ of the first air pressure sensor 5 in different areas, for example, it is not only identified that the seat is sat by occupants of different weights, but also that the main seat area and the left side flank support area or the right side flank support area of the seat are occupied.

Figure 2A:
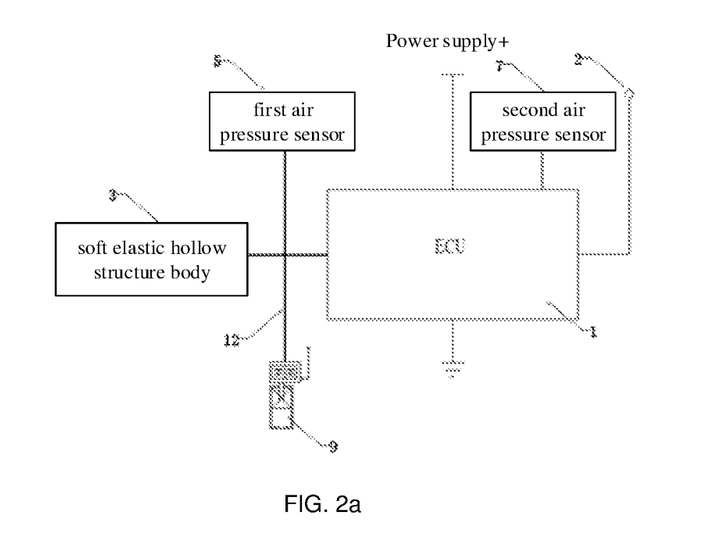
FIG. 2a is a schematic view of the electrical connection of the pneumatic identification apparatus shown in FIG. 1.

In the above, in a preferred embodiment of the sensing unit, as shown in FIG. 2a, the sensing unit may further comprise a second air pressure sensor 7, and the second air pressure sensor 7 is configured to detect the second air pressure value $P_b$ in the outside world; the output end of the second air pressure sensor 7 may be connected to the input end of the control unit 1, and the control unit 1 is further configured to: calculate $P_c=P_0-P_b$, $P_0$ is standard atmospheric pressure; and reduce all of the standard set values by $P_c$.

Specifically, when the apparatus is in an environment such as a plateau, the external atmospheric pressure thereof is lower than the standard atmospheric pressure, which is easy to cause inaccurate standard set values set in this environment. Therefore, the external second air pressure value $P_b$ is detected by the second air pressure sensor 7, and the air pressure difference value $P_c$, i.e., the difference value between the second air pressure value $P_b$ and the standard atmospheric pressure value P0, is calculated by the control unit 1, and then the standard set values are adjusted, that is, the standard set values are reduced by $P_c$ to correct the standard set values.

It can be known that when the second air pressure value $P_b$ detected by the apparatus is higher than the standard atmospheric pressure $P_0$, the air pressure difference value $P_c$ obtained by calculation is a negative value, at this time, the control unit corrects each standard set value to the sum of the standard set value and the absolute value of the air pressure difference value Pc.

Figure 3:
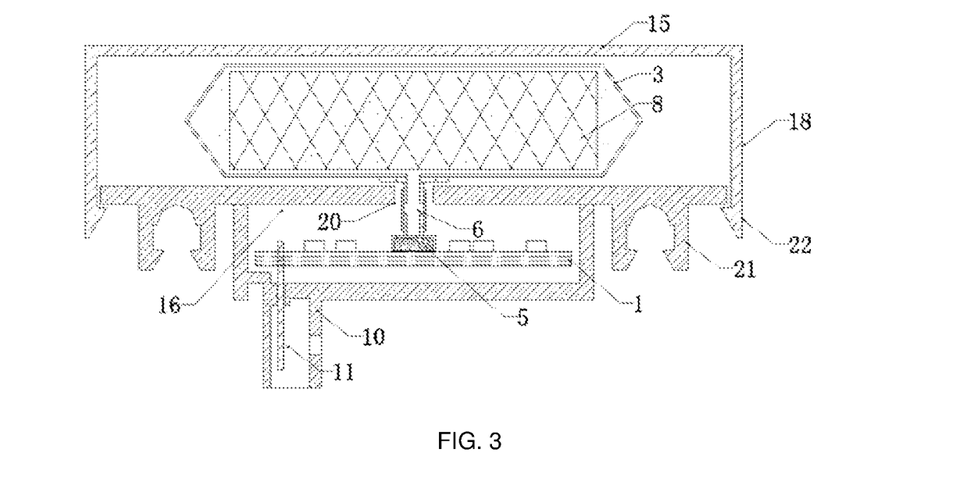
FIG. 3 is a structural schematic view of a top pressure-bearing plate having the bottom provided with a pressure-bearing vertical plate.

In the above, in a preferred embodiment of the auxiliary sensing apparatus, the auxiliary sensing apparatus further comprises a pressure-bearing vertical plate 18, a restriction assembly body 22 is installed at one end of the pressure-bearing vertical plate 18, and the restriction assembly body 22 abuts against the bottom of the bottom carrying plate 16, and the other end of the pressure-bearing vertical plate 18 is fixedly connected to the bottom of the top pressure-bearing plate 15.

When the top pressure-bearing plate 15 is subjected to a downward action force, the pressure-bearing vertical plate 18 is installed at the bottom of the top pressure-bearing plate 15, so that the pressure-bearing vertical plate 18 moves downward following the top pressure-bearing plate 15, and is in sliding contact with the side surface of the bottom carrying plate 16, so that the pressure-bearing vertical plate 18 is kept to move vertically downward to prevent occurrence of horizontal offset or longitudinal inclination that affects the accuracy of measurement.

Simultaneously, a plurality of the pressure-bearing vertical plates 18 may be provided to enhance the positioning effect, which is beneficial to protect the soft elastic hollow structure body 3 from being damaged; and simultaneously, the pressure-bearing vertical plate 18, the bottom carrying plate 16, the top pressure-bearing plate 15 and the soft elastic hollow structure body 3 can also be assembled into one piece, which is convenient for installation.

Figure 4:
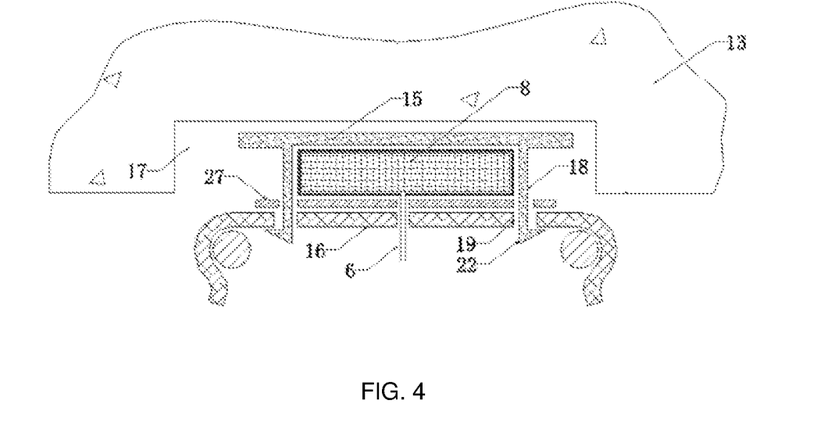
FIG. 4 is a schematic view of an installation structure in which a bottom carrying plate is provided with first through holes.

In the above, in a preferred embodiment of the bottom carrying plate 16, as shown in FIG. 4, the bottom carrying plate 16 is provided with at least one first through hole 19 running therethrough, and the restriction assembly body 22 of the pressure-bearing vertical plate 18 passes through the first through hole 19 so that the restriction assembly body 22 abuts against the bottom of the bottom carrying plate 16 to prevent the pressure-bearing vertical plate 18 from falling off from the bottom carrying plate 16.

By providing the first through hole 19 in the bottom carrying plate 16, the restriction assembly body 22 of the pressure-bearing vertical plate 18 passes through the first through hole 19, then, in the process of the top pressure-bearing plate 15 falling under the force, the positioning protection of the top pressure-bearing plate 15 can be performed, which can prevent horizontal deviation or longitudinal inclination, so that the positioning effect is better, and the measurement accuracy is not affected.

Optionally, as shown in FIG. 4, an auxiliary bearing layer 27 may also be installed on the top of the bottom carrying plate 16, and the auxiliary bearing layer may be at least one of a hard board, a sticky mat, and a spongy layer, the auxiliary bearing layer can prevent the damage of the apparatus caused by the top pressure-bearing plate 15 being pressed, due to excessively large force, down to the upper surface of the bottom carrying plate 16, which plays a certain buffering effect.

Figure 5:
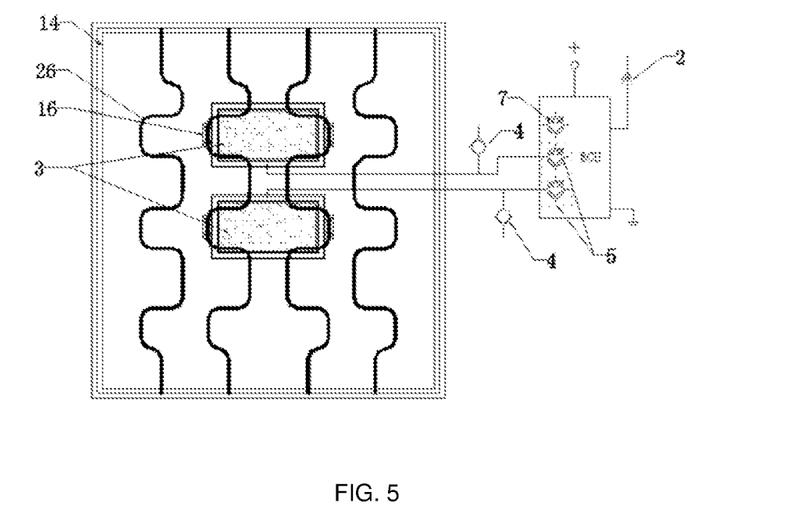
FIG. 5 is a schematic top view of the structure of a spring bracket.

In the above, as shown in FIG. 5, in a preferred embodiment of the pneumatic sensing apparatus, the pneumatic sensing apparatus further includes at least one one-way check valve 4, and the air outlet of the one-way check valve 4 communicates with the soft elastic hollow structure body 3, and the air inlet of the one-way check valve 4 communicates with the external atmosphere of the soft elastic hollow structure body 3. Specifically, the external atmosphere of the soft elastic hollow structure body 3 is the cabin atmospheric pressure.

Figure 6:
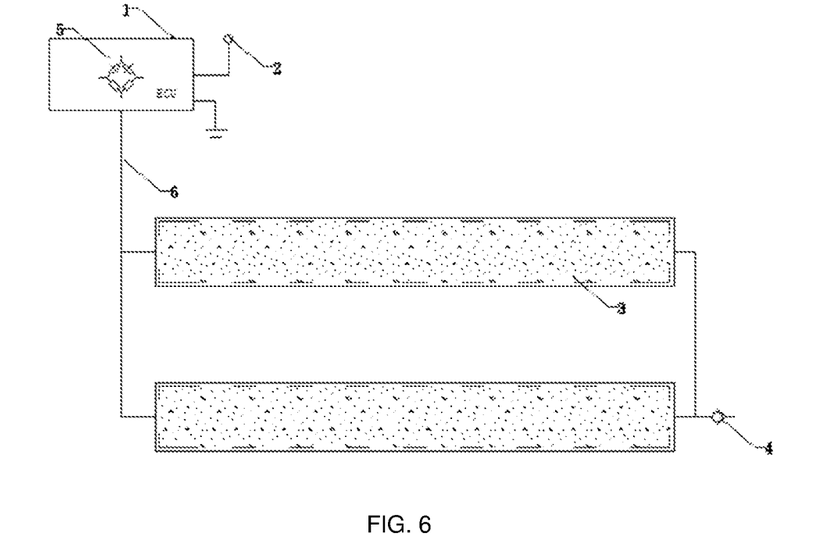
FIG. 6 is a structural schematic view of communication of two soft elastic hollow structure bodies.

As shown in FIG. 6, the soft elastic hollow structure body 3 is communicated with the one-way check valve 4, when the soft elastic hollow structure body 3 is stressed for a long time, it may cause a small leakage of the air circuit inside the soft elastic hollow structure body 3 so that the interior of the soft elastic hollow structure body 3 is under negative pressure and is deficient in air (air loss); it is also possible that after long-term use, the soft elastic hollow structure body 3 or the soft rebound filling body 8 inside thereof has the difference from the initial state due to the fatigue, which causes the internal air pressure to be lower than the external atmospheric pressure, so that the soft elastic hollow structure body 3 is slightly collapsed and deformed, the elastic reset (returning to the original state) of the soft elastic hollow structure body 3 is affected due to the pressure difference, so that the shape of the hollow structure body 3 cannot be restored to its original shape, and at this time, air from the open one-way check valve 4, under the influence of the pressure difference between interior and exterior, can be filled into the interior of the soft elastic hollow structure body 3 by the external atmospheric pressure, so that the internal and external air pressures are balanced and the interior is filled.

Figure 10:
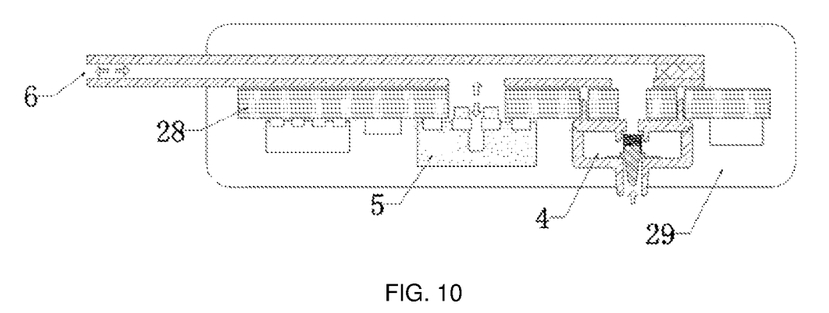
FIG. 10 is a use state view of the pneumatic identification apparatus.

Specifically, the one-way check valve 4 and the first air pressure sensor 5 may be provided in any link of the air circuit in the sensing module, may be provided at the soft elastic hollow structure body 3, and simultaneously, may also be both integrated in the housing 29 of the control unit 1, as shown in FIG. 10, the end of the first air pipe 6 connecting the one-way check valve 4 and one side of the first air pressure sensor 5, the first air pressure sensor 5 and the one-way check valve 4 may be hermetically installed in the housing 29 of the control unit 1; the first air pressure sensor 5 and the one-way check valve 4 may be provided on the circuit board 28 of the control unit 1, and the end of the first air pipe 6 connecting the one-way check valve 4 and one side of the first air pressure sensor 5 may be provided with two openings, one opening may communicate with the air circuit of the first air pressure sensor 5, and the other opening may communicate with the air outlet of the one-way check valve 4, and the air inlet of the one-way check valve 4 is exposed outside the housing 29 of the control unit 1, and communicates with the air in the vehicle cabin.

Specifically, a valve core and an elastic body (such as a spring) may be provided in the one-way check valve 4, and when the air pressure value in the cabin is greater than the air pressure value in the soft elastic hollow structure body 3, this pressure difference enables the air inlet of the one-way check valve 4 to be opened through the valve core moving against the elastic force of the elastic body, and the air in the cabin enters the soft elastic hollow structure body 3 through the one-way check valve 4; when the air pressure value in the cabin is less than the air pressure value of the soft elastic hollow structure body 3, the valve core keeps the air inlet of the one-way check valve 4 closed under the action of the pressure of the elastic body and the pressure difference between the soft elastic hollow structure body 3 and the interior of the cabin, and the air in the soft elastic hollow structure body 3 does not flow to the cabin via the one-way check valve 4.

In the above, in a preferred embodiment of the soft elastic hollow structure body 3, as shown in FIG. 1 or FIG. 3, the soft rebound filling body 8 may be installed in the soft elastic hollow structure body.

Preferably, the soft rebound filling body 8 may be at least one of a foamed sponge, a three-dimensional spacer fabric, a corrugated rubber-plastic spacer, and a soft elastic non-woven cushion.

By installing the soft rebound filling body 8 in the soft elastic hollow structure body 3, the soft elastic hollow structure body 3 is enabled to be conveniently rebound and automatically return to the original state, preventing the soft elastic hollow structure body 3 from being deformed, which is conductive to continuous compress or rebound process for a long time.

Figure 2B:
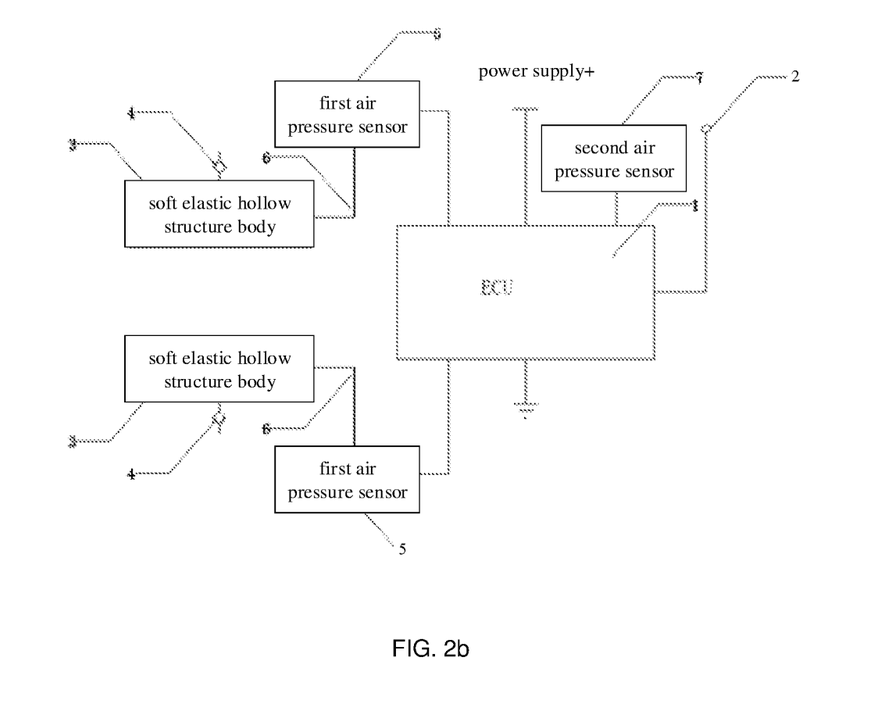
FIG. 2b is a schematic view of the electrical connection of the pneumatic identification apparatus including two sensing apparatuses.

In the above, in a preferred embodiment of the pneumatic identification apparatus, as shown in FIG. 2b, there are several sensing apparatuses, and the several sensing apparatuses share one control unit 1, and the air circuits between sensing apparatuses are not communicated. When there are two or more sensing apparatuses, the second air pressure sensor 7 may be shared.

In the above, in a preferred embodiment of the pneumatic sensing apparatus, as shown in FIG. 3, the pneumatic sensing apparatus may further comprise a circuit connector 10, wherein the circuit connector 10 may be provided at the bottom of the bottom carrying plate 16, and the interior of circuit connector 10 is connected to the control unit 1 and the sensing unit through the connector terminal 11, a second through hole 20 is provided running through the bottom of the bottom carrying plate 16, so that the first air pipe 6 makes the first air pressure sensor 5 communicating with the soft elastic hollow structure body 3 through the second through hole 20, and the circuit connector 10 communicates with the external communication 2 through the connector terminal 11.

Through the above-mentioned structures, the pneumatic sensing apparatus and the auxiliary sensing apparatus may be installed as one body, which is convenient for the manufacturing, use and installation process, and conductive to realize the standardization of the apparatus.

The present disclosure also provides a pneumatic identification seat, as shown in FIG. 4, which may include a seat surface and/or a backrest, and a spring bracket 14 and a spongy cushion 13 are installed on the seat surface and/or the backrest, and a pneumatic identification apparatus of the above-mentioned structure may be further included, wherein a groove 17 is provided at the bottom of the spongy cushion 13, and the pneumatic identification apparatus is installed in the groove 17.

Specifically, the top pressure-bearing plate 15, the bottom carrying plate 16, the pressure-bearing vertical plate 18 and the soft elastic hollow structure body 3 can be pre-assembled into one body, and then the top pressure-bearing plate 15 is installed in the groove 17 and the bottom carrying plate 16 is fixedly connected to the spring bracket 14; simultaneously, the top pressure-bearing plate 15 may also be pre-installed in the groove 17, and then the soft elastic hollow structure body 3 provided with the bottom carrying plate 16 is installed at the bottom of the top pressure-bearing plate 15.

Specifically, the bottom carrying plate 16 can also be as shown in FIG. 5, several bottom carrying plates 16 can also be installed at the bottom of the soft elastic hollow structure body 3, and the bottom carrying plate 16 is fixedly connected to the spring bracket 14 through the steel lacing wire 26 on the spring bracket 14.

Figure 9:
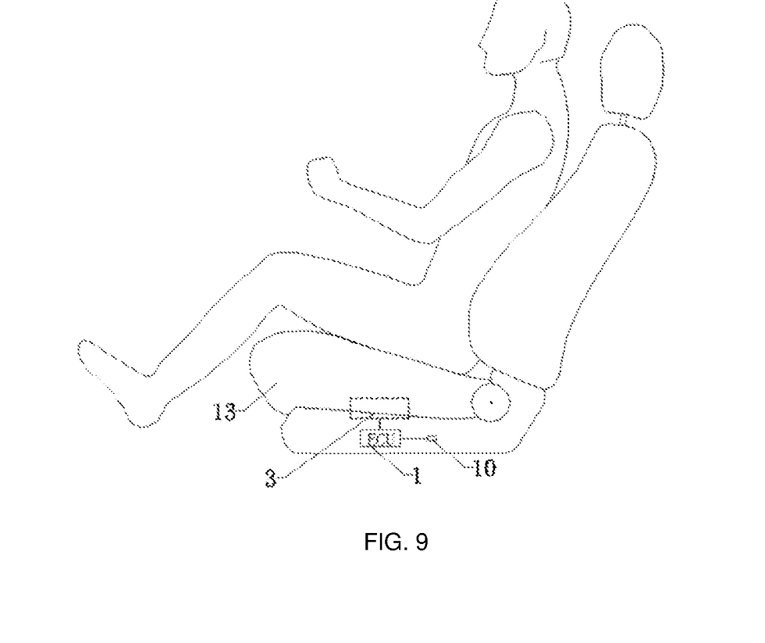
FIG. 9 is a use state view of the pneumatic identification apparatus.

Working principle: when an occupant is sitting, as shown in FIG. 9, the spongy cushion 13 is subjected to downward pressure, and the top pressure-bearing plate 15 can transmit the pressure to the upper surface of the soft elastic hollow structure body 3, and simultaneously, under the carrying action of bottom carrying plate 16 on the spring bracket 14, the air pressure inside the soft elastic hollow structure body 3 is increased; then the first air pressure value $P_a$ inside the soft elastic hollow structure body is measured by the first air pressure sensor 5: the heavier the weight of occupant is, the larger the first air pressure value $P_a$ in the soft elastic hollow structure body 3 is; and the lighter the weight of occupant is, the smaller the first air pressure value $P_a$ in the soft elastic hollow structure body 3 is; then, the control unit 1 compares the air pressure value $P_a$ detected by the first air pressure sensor 5 with the standard set values for determination, and then correspondingly outputs the human body weight type to the external communication 2; when the occupant leaves, the soft elastic hollow structure body 3 rebounds to the original state.

Through the mutual cooperation of the above-mentioned structures, the human body type of the occupant may be effectively detected, which can provide assistance for the improvement of safety performance and the vehicle safety system, and provide a reliable foundation for the development of vehicle safety.

In the above, in a preferred embodiment of the bottom carrying plate 16, as shown in FIG. 3, a positioning apparatus configured to be fixedly connected to the spring bracket 14 is installed at the bottom of the bottom carrying plate 16, and the positioning apparatus is snapped or fixedly connected to the spring bracket 14.

The above-mentioned positioning apparatus can be a hook, buckle or the like; preferably, a positioning hook 21 can be selected as the positioning apparatus;

the bottom carrying plate 16 is snapped to the spring bracket 14 by the positioning hook 21, so as to facilitate disassembly and replacement, and help to improve the installation or disassembly efficiency; specifically, the positioning hook 21 can be fixedly connected to the bottom carrying plate 16 in a manner of welding, and simultaneously, the positioning hook 21 and the bottom carrying plate 16 can also be in an integral structure.

Optionally, as shown in FIG. 2a, the soft elastic hollow structure body 3 may also be communicated with an air source apparatus, and the air source apparatus includes: an air source 9; in order to avoid possible internal negative pressure and deficiency in air inside the soft elastic hollow structure body 3 due to a small leakage of the air circuit inside the soft elastic hollow structure body 3 generated when the soft elastic hollow structure body 3 is stressed for a long time, the soft elastic hollow structure body 3 communicates with the air source apparatus through the second air pipe 12, so that the air source 9 inflates or deflates the soft elastic hollow structure body 3, and the air source 9 can be an air pump apparatus.

Optionally, the control unit is further configured that: when the acquired first air pressure value $P_a$ is lower than the first threshold value $P_1$, the control unit controls the air source apparatus to deflate, so that the internal and external pressures of the soft elastic hollow structure body 3 are balanced.

Optionally, the control unit may further be configured to: control the air source apparatus to inflate, when the air pressure value $P_a$ is greater than the first threshold value $P_2$, the soft elastic hollow structure body 3 until the first air pressure value $P_a$ reaches the sixth threshold value $P_6$, acquire the inflation time at the same time, and then output the human body type of the occupant. It can be known that the shorter the inflation time is, the heavier the weight of occupant is, and the longer the inflation time is, the lighter the weight of occupant is; preferably, a plurality of time thresholds such as $t_1$, $t_2$, $t_3$ may be further set in the control unit, and the inflation time is compared with the time thresholds to perform determination and output the corresponding human body weight type.

Figure 7:
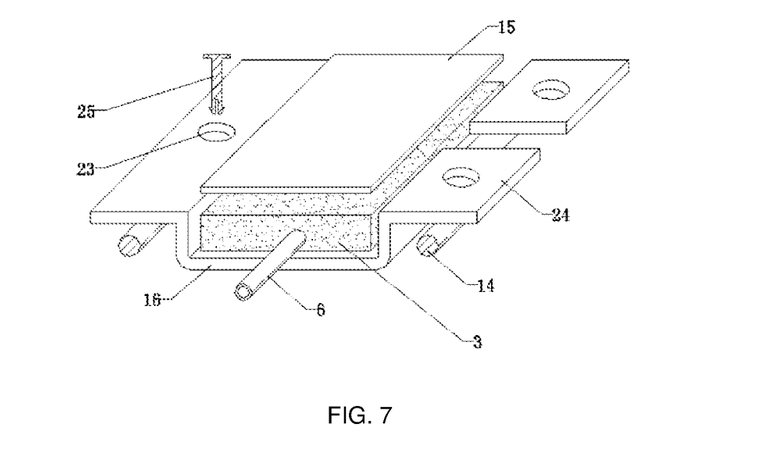
FIG. 7 is a structural schematic view of a bottom carrying plate having two ends provided with carrying fenders.

Optionally, as shown in FIG. 7, the bottom carrying plate 16 may also be fixedly connected to the steel lacing wire 26 on the spring bracket 14 through the carrying fenders 24 installed at two ends of the bottom carrying plate and provided with positioning mounting holes 23. The installation method can be achieved by inserting the positioning dowels 25 through the positioning mounting holes 23 to be fixedly connected with the steel lacing wires 26.

Figure 11:
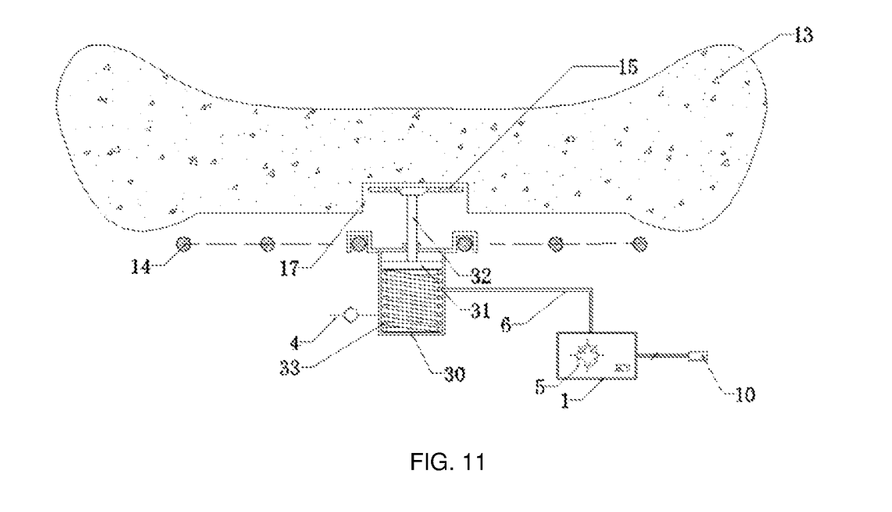
FIG. 11 is a structural schematic view of the pneumatic identification apparatus for human body weight of seat occupant.

Optionally, as shown in FIG. 11, the soft elastic hollow structure body 3 may be embodied as a cavity 30 with a fixed volume, the cavity 30 has a built-in piston 31, and the piston 31 can divide the cavity 30 into two parts: an upper part and a lower part, wherein the air in the upper part of the cavity does not communicate with the air in the lower part of the cavity; a piston rod 32 is provided above the piston 30, the piston rod 32 extends out of the piston 30 through the upper part of the cavity of the piston 30, and simultaneously, the piston rod 32 can extend out of the cavity 30 and be fixed with the top pressure-bearing plate 15, the cavity 30 may be provided with an elastic body 33 in the cavity below the piston 31, and one end of the elastic body 33 abuts against the lower end surface of the piston 31, the other end abuts against the bottom of the cavity 30; the one-way check valve 4 and the first air pressure sensor 5 are communicated with the cavity 30 below the piston 31. When a person is sitting, the human body is loaded on the seat spongy cushion 13, and the spongy cushion 13 is forced to sink to drive the top pressure-bearing plate 15 to move down, and then the piston rod 32 drives the piston 31 to move down against the force of the elastic body 33; the volume of the cavity 30 below the piston 31 becomes smaller and the air pressure value increases, the first air pressure sensor 5 communicated thereto feeds back the detected air pressure value $P_a$ to the control unit 1, and the control unit 1 compares the $P_a$ value with the standard set values for determination, and correspondingly outputs the human body weight type to the external communication 2. When the human body leaves the seat spongy cushion 13, the pressure on the spongy cushion 13, the top pressure-bearing plate 15, and the piston rod 32 disappears, on the one hand, the spongy cushion 13 returns to the unstressed state, on the other hand, the elastic force of the compressed elastic body 33 and the air pressure of the lower part of the piston 31 in the cavity 30 are greater than the air pressure of the upper part, and the position of the piston 31 is moved up to force balances at both ends, at this time, the air pressure value detected by the first air pressure sensor 5 restores to the initial state, the control unit 1 determines that the seat is unoccupied (i.e., no one is sitting). The function of the one-way check valve 4 is the same as that described above, and the description is not repeated here.

The above description is only a preferred embodiment of the present disclosure and an illustration of the applied technical principles. Those skilled in the art should understand that the scope of the present disclosure involved in the present disclosure is not limited to the technical solution formed by the specific combination of the above-mentioned technical features, and simultaneously, should also cover other technical solutions formed by any combination of the above-mentioned technical features or equivalent features thereof without departing from the inventive concept. For example, a technical solution is formed by replacing the above-mentioned features with the technical features disclosed in this present disclosure (but not limited to) having similar functions with each other.

INDUSTRIAL APPLICABILITY

The present disclosure provides a pneumatic identification apparatus for human body weight of seat occupant and a pneumatic identification seat, which can effectively detect the human body type of the occupant, provide assistance for the improvement of safety performance and vehicle safety system, and provide a reliable foundation for the development of vehicle safety.

In addition, it can be understood that the pneumatic identification apparatus for human body weight of seat occupant and the pneumatic identification seat provided by the present disclosure can be used in industrial applications and can be reproduced.

What is claimed is:

1. A pneumatic identification apparatus for human body weight of a seat occupant, comprising a control unit and at least one sensing apparatus, wherein the at least one sensing apparatus each comprises a pneumatic sensing apparatus and an auxiliary sensing apparatus;

the pneumatic sensing apparatus comprises at least one soft elastic hollow structure body with an intermediate air space structure and a sensing unit; the sensing unit comprises a first air pressure sensor; and the soft elastic hollow structure body communicates with the first air pressure sensor wherein the first air pressure sensor is configured to detect a first air pressure value $P_a$ in the soft elastic hollow structure body;

the auxiliary sensing apparatus comprises a top pressure-bearing plate and a bottom carrying plate, wherein the top pressure-bearing plate is provided on an upper end surface of the soft elastic hollow structure body, and the bottom carrying plate is provided at a lower end surface of the soft elastic hollow structure body; and an input end of the control unit is connected to an output end of the first air pressure sensor, and an output end of the control unit is connected to an external communication;

and the control unit is configured to acquire the first air pressure value $P_a$, compare the first air pressure value $P_a$ with standard set values, and correspondingly output a human body weight type to the external communication.

2. The pneumatic identification apparatus according to claim 1, wherein the standard set values comprise a first threshold value $P_1$, a second threshold value $P_2$, a third threshold value $P_3$, a fourth threshold value $P_4$ and a fifth threshold value $P_5$, wherein when the first air pressure value $P_a$ is less than or equal to the first threshold value $P_1$, the control unit outputs information of seat being unoccupied;

when the first air pressure value $P_a$ is greater than the first threshold value $P_1$ and less than the second threshold value $P_2$, the control unit outputs information of seat being occupied;

when the first air pressure value $P_a$ is greater than the second threshold value $P_2$ and less than the third threshold value $P_3$, the control unit outputs information of small-weight occupant;

when the first air pressure value $P_a$ is greater than the third threshold value $P_3$ and less than the fourth threshold value $P_4$, the control unit outputs information of medium-weight occupant;

when the first air pressure value $P_a$ is greater than the fourth threshold value $P_4$ and less than the fifth threshold value $P_5$, the control unit outputs information of large-weight occupant; and when the first air pressure value $P_a$ is greater than or equal to the fifth threshold value $P_5$, the control unit outputs heavy-weight occupant information of heavy-weight occupant.

3. The pneumatic identification apparatus according to claim 2, wherein when the first air pressure value $P_a$ is equal to the second threshold value $P_2$, the control unit outputs the information of seat being occupied;

when the first air pressure value $P_a$ is equal to the third threshold value $P_3$, the control unit outputs the information of small-weight occupant; and when the first air pressure value $P_a$ is equal to the fourth threshold value $P_4$, the control unit outputs the information of medium-weight occupant.

4. The pneumatic identification apparatus according to claim 2, wherein the first threshold value $P_1$ is set to 0.02 Mpa, the second threshold value $P_2$ is set to 0.025 Mpa, the third threshold value $P_3$ is set to 0.03 Mpa, the fourth threshold value $P_4$ is set to 0.035 Mpa, and the fifth threshold value $P_5$ is set to 0.04 Mpa, wherein set values of the first threshold value $P_1$, the second threshold value $P_2$, the third threshold value $P_3$, the fourth threshold value $P_4$ and the fifth threshold value $P_5$ are relative values relative to a standard atmospheric pressure.

5. The pneumatic identification apparatus according to claim 1, wherein the sensing unit further comprises a second air pressure sensor, and the second air pressure sensor is configured to detect a second air pressure value $P_b$ in outside world; an output end of the second air pressure sensor is connected to an input end of the control unit, and the control unit is further configured to: calculate $P_c=P_0-P_b$, $P_0$ being standard atmospheric pressure, and reduce all of the standard set values are $P_c$.

6. The pneumatic identification apparatus according to claim 1, wherein the auxiliary sensing apparatus further comprises at least one pressure-bearing vertical plate, one end of the at least one pressure-bearing vertical plate is provided with a restriction assembly body, the restriction assembly body abuts against a bottom of the bottom carrying plate, and the other end of the pressure-bearing vertical plate is fixedly connected to a bottom of the top pressure-bearing plate.

7. The pneumatic identification apparatus according to claim 6, wherein at least one first through hole is provided running through the bottom carrying plate, and the at least one pressure-bearing vertical plate passes through the at least one first through hole so as to make the restriction assembly body abut against the bottom of the bottom carrying plate.

8. The pneumatic identification apparatus according to claim 1, wherein the pneumatic sensing apparatus further comprises at least one one-way check valve, an air outlet of the at least one one-way check valve communicates with the soft elastic hollow structure body, and an air inlet of the at least one one-way check valve communicates with an external atmosphere of the soft elastic hollow structure body.

9. The pneumatic identification apparatus according to claim 1, wherein a soft rebound filling body is installed in the soft elastic hollow structure body.

10. The pneumatic identification apparatus according to claim 9, wherein the soft rebound filling body is at least one of a foamed sponge, a three-dimensional spacer fabric, a corrugated rubber-plastic spacer, and a soft elastic nonwoven cushion.

11. The pneumatic identification apparatus according to claim 1, wherein several sensing apparatuses are provided, and the several sensing apparatuses share the one control unit, wherein the air circuits between sensing apparatuses are not communicated.

12. The pneumatic identification apparatus according to claim 1, wherein the pneumatic sensing apparatus further comprises a circuit connector, the circuit connector is provided at a bottom of the bottom carrying plate, and an interior of circuit connector is connected with the control unit and the sensing unit.

13. The pneumatic identification apparatus according to claim 1, wherein an auxiliary bearing layer is provided between a top of the bottom carrying plate and the soft elastic hollow structure body, and the auxiliary bearing layer is configured to protect and buffer the soft elastic hollow structure body to prevent the pneumatic identification apparatus from being damaged due to excessively large force applied on the soft elastic hollow structure body.

14. The pneumatic identification apparatus according to claim 1, wherein the soft elastic hollow structure body is further communicated with a human body detection sensor switch, wherein the human body detection sensor switch is any one of a membrane type pressure electronic switch, a capacitive type human body detection sensor, a mechanical type electric shock pressure sensor, and an image sensor, and simultaneously, the human body detection sensor switch is connected to the control unit to cooperate with each other to detect human body type information.

15. The pneumatic identification apparatus according to claim 1, wherein the soft elastic hollow structure body is further communicated with an overflow valve.

16. A pneumatic identification seat, comprising a seat surface and/or a backrest, wherein a spring bracket and a spongy cushion are installed on the seat surface and/or the backrest; and further comprising the pneumatic identification apparatus according to claim 1, wherein a groove is provided at a bottom of the spongy cushion, and the pneumatic identification apparatus is installed in the groove.

17. The pneumatic identification seat according to claim 16, wherein a positioning apparatus configured to be fixedly connected to the spring bracket is installed at a bottom of the bottom carrying plate, and the positioning apparatus is fixedly connected to the spring bracket.

18. The pneumatic identification apparatus according to claim 3, wherein the first threshold value $P_1$ is set to 0.02 Mpa, the second threshold value $P_2$ is set to 0.025 Mpa, the third threshold value $P_3$ is set to 0.03 Mpa, the fourth threshold value $P_4$ is set to 0.035 Mpa, and the fifth threshold value $P_5$ is set to 0.04 Mpa, wherein set values of the first threshold value $P_1$, the second threshold value $P_2$, the third threshold value $P_3$, the fourth threshold value $P_4$ and the fifth threshold value $P_5$ are relative values relative to a standard atmospheric pressure.

19. The pneumatic identification apparatus according to claim 5, wherein a soft rebound filling body is installed in the soft elastic hollow structure body.

20. The pneumatic identification apparatus according to claim 8, wherein a soft rebound filling body is installed in the soft elastic hollow structure body.

* * * * *